Sept. 26, 1939.　　　　　E. C. RANEY　　　　　2,174,276
CONTROL APPARATUS
Filed May 18, 1936　　　3 Sheets-Sheet 1

INVENTOR
Estel C. Raney
BY
Warren H. F. Schmieding
ATTORNEY

Sept. 26, 1939.   E. C. RANEY   2,174,276
CONTROL APPARATUS
Filed May 18, 1936   3 Sheets-Sheet 2

INVENTOR
Estel C. Raney
BY Warren H. F. Schmieding
ATTORNEY

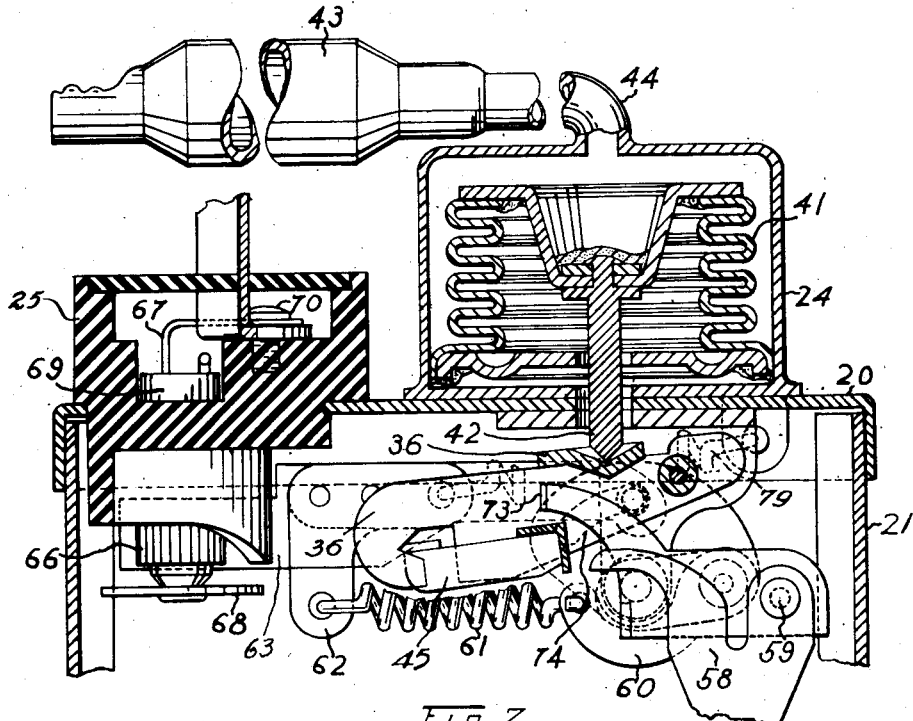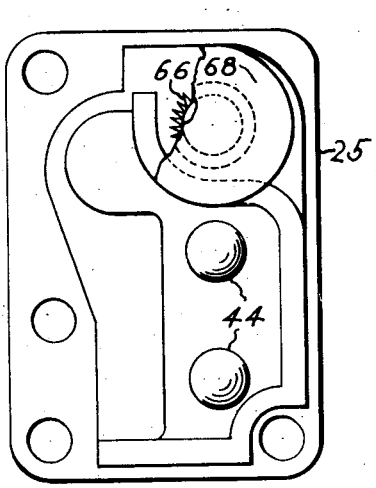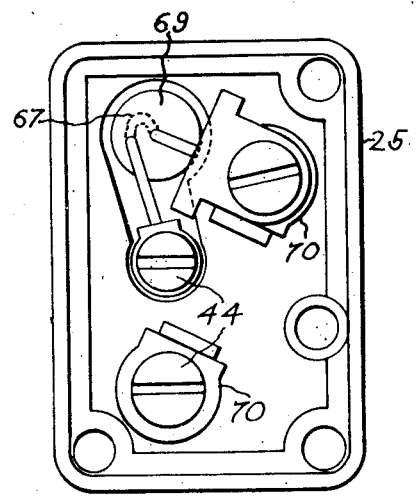

Patented Sept. 26, 1939

2,174,276

UNITED STATES PATENT OFFICE 2,174,276

CONTROL APPARATUS

Estel C. Raney, Columbus, Ohio, assignor to Ranco Incorporated, a corporation of Ohio Application May 18, 1936, Serial No. 80,294

13 Claims. (Cl. 200—83)

My present invention relates to controllers having a number of adjustable features and more particularly to controllers suitable for electric refrigerators incorporating temperature, defrost, and fast-freeze adjustments in the same adjustment means.

One type of controller for refrigerating systems, for example, is used often for various refrigerators and, in that event, the controller must be adaptable to suit the various conditions under which it may be required to function and therefore must be readily adjustable. In addition to the adjustment necessary for satisfying the particular refrigerator to which it is connected, it must also be adjustable to meet the immediate demands of control, for example it must be adjustable for various refrigerating demands, adjustable for defrosting the refrigerator and adjustable for quick freezing of water or desserts. For these latter adjustments, a knob is usually provided by which the unskilled attendant may manipulate the controller.

One of the objects of the present invention is to provide a controller having an adjustment knob or the like for manipulating the controller and to provide for limiting the actual adjustment of the controller even though further movement is imparted to the knob.

Another object is to provide a controller having adjusting means which will allow a fixed rate of adjustment throughout the adjusting range and cooperating members that will provide an accelerated rate of adjustment over part of the adjustment range.

Another object is to provide adjustable stops within the controller whereby the defrosting and fast freezing limits may be varied.

Other objects will be apparent through the disclosures and drawings contained herein.

Fig. 7 is a sectional side elevation of a part of the switch giving details on the assembly of the bellows, contacts, etc.

Fig. 8 is a front view of the connection block showing the solder pot and the back of the contact;

Fig. 9 is the opposite side of the connection block shown in Fig. 8 showing the connections between the contacts and the solder pot.

Figure 6:
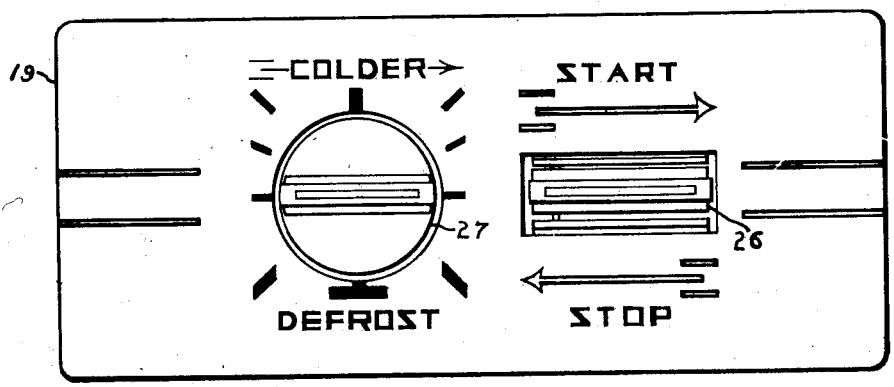
Fig. 6 shows the outer design of the control plate.

Referring to Fig. I, numeral 20 represents a base, or main frame of the controller, herein shown as an electric switch. A supplemental frame 21 with mountings 23 is removably secured to base 20 by screws 22. The switch is also provided with sides (not shown) to completely enclose the mechanism. A bellows frame 24 and a terminal block 25, fabricated from an insulating material, are removably engaged to the base 20. The switch is provided with a manual on and off control which is actuated by a bar shaped button 26, and a range adjustment knob 27 controls the setting of the switch. The design of these members as well as the face plate 19 may be noted in Fig. 6. Knob 27 is moulded to, or otherwise firmly connected to a shaft 28, which shaft is secured on its opposite end to a cam 29. This cam 29 acts upon a connecting rod 30 which holds a lever 31 to a slidable member 32. Slidable member 32 is held in place, with allowance for longitudinal movement, by the pins 39 and 40. The rod 30 acts not only as a follower for the cam but also as the fulcrum for the lever 31. The construction of this adjustment mechanism is an important part of my present invention as it provides for selective adjustment of the actuating means. A tension spring 35 is used to connect the lever 31 to an actuating member or bell crank lever 36 which is pivoted on pin 52. The tension of spring 35 is adjusted by a nut 38 on a screw 37. Changing the tension on this spring will shift the entire adjustment range up or down according to the direction of rotation of the nut 38.

Figure 3:
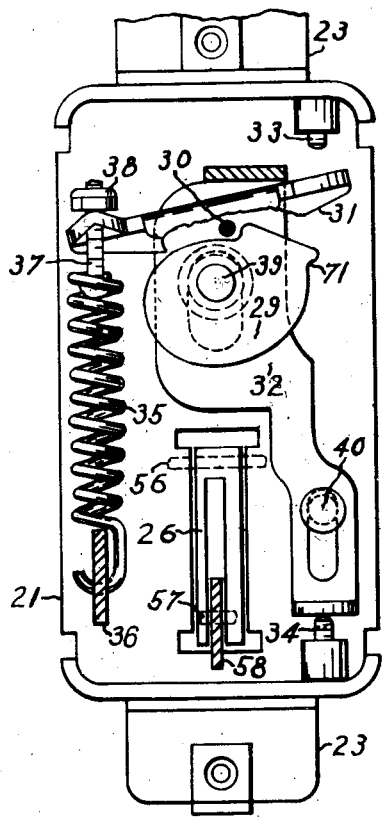
Fig. 3 is a sectional view taken on line 3—3 of Fig. I, showing the mechanism in a fast freeze position.
Figures 4, 5:
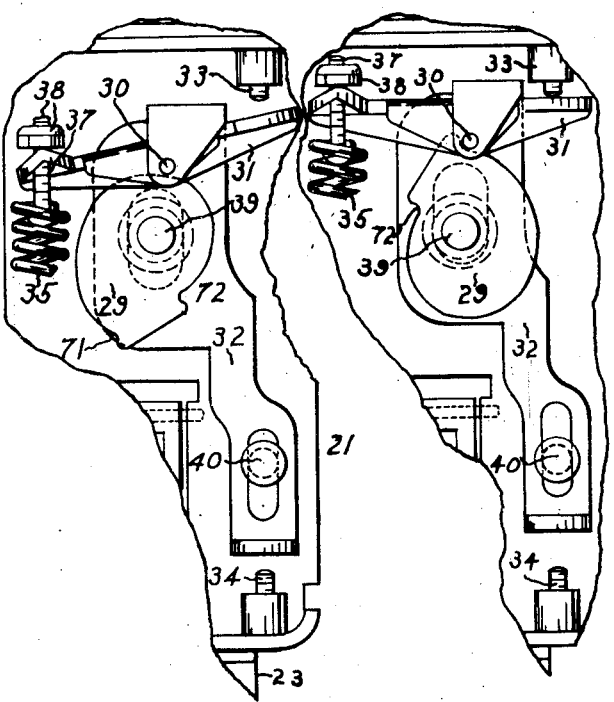
Fig. 4 is a view similar to Fig. 3 but showing the adjustment mechanism in its normal operating position.
Fig. 5 is a view similar to Fig. 3 but showing the adjustment mechanism in its defrosting position.

This construction may be better studied in Figs. 3, 4 and 5. In Fig. 3, the switch is in a "fast freeze" position. The spring 35 is under a minimum of tension and the slidable member 32 is against a stop 34. As the temperature setting is raised by the adjustment of knob 27, the eccentric cam 29 moves the slidable member 32 away from stop 34, this position being illustrated in Fig. 4. It will be noted that the lever 31 acts as an integral part of the slidable member 32;

that is, during normal adjustment, the lever does not move except longitudinally with the slide. It will also be noted that the spring 35 holds the lever 31 against the wall of the U-shaped end of the sliding member 32. This movement changes the tension of spring 35 and accordingly changes the temperature at which the switch operates.

Fig. 5 shows the mechanism in the defrosting position. In this position, the lever 31 is engaged with the stop 33 and changes to a third class lever during movement of cam 29, with a fulcrum at the stop 33, a load at the spring end and a force intermediate the two ends, as provided by the movement of the slide 32. Therefore as soon as the lever 31 engages the stop 33 the rate of movement or increasing tension on the spring 35 is greatly accelerated. This is not only due to the lever action but to the added movement of the slide 32 as advanced by the cam 29. This cam is provided with notches or stops at 71 and 72. Stop 71 limits the defrosting position movement and also aids in holding the cam in this position. It is evident that when the slope on the cam is sufficient to obtain the required movement, that it would tend to slip unless a stop or notch was provided. The stop 72 is used to limit the movement of the cam in the opposite direction. The two notches 71 and 72 are disposed in such a manner that the maximum rotation of the cam 29 as provided by the knob 27 is less than one revolution or 360°. The stops 33 and 34 as previously referred to, are adjustable to vary the fast freeze or defrosting temperatures without changing the normal operating range of the instrument.

Figure 1:
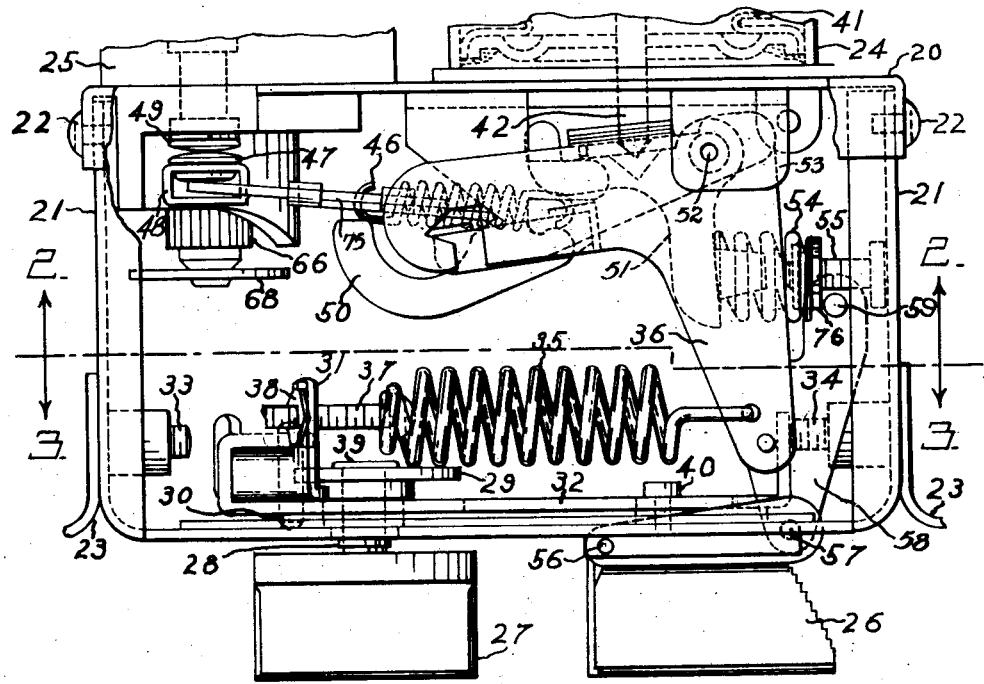
Fig. 1 represents a side elevational view of the controller.
Figure 2:
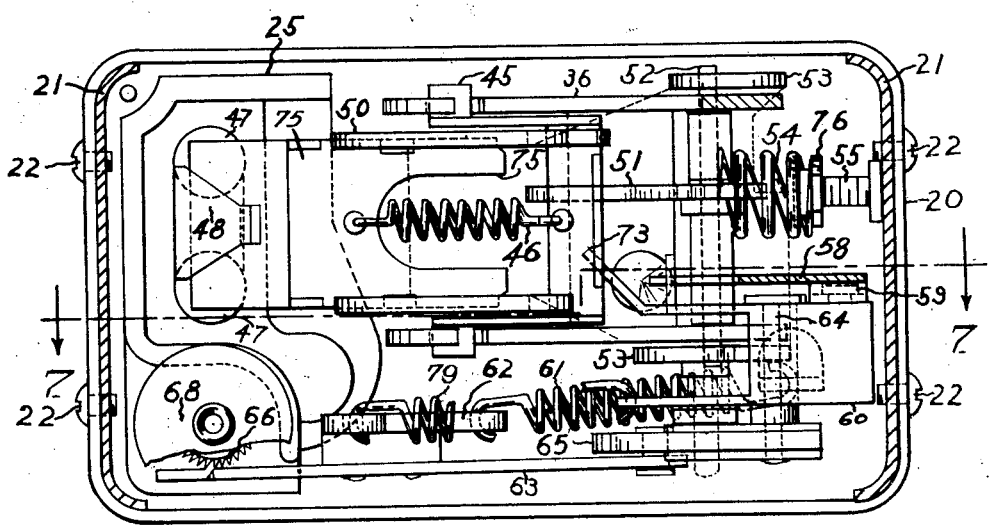
Fig. 2 is a front sectional view on the line 2—2 of Fig. I, showing the elements of the snap mechanism.

The actuating member 36 in Fig. I is moved by the change of length of a bellows 41, which movement is mechanically transmitted through a push pin 42. The bellows is expanded and compressed by changes in temperature in a bulb 43 which is connected with the bellows housing 24 by a tube 44. Referring to Fig. 2, a flipper of snap member 45 is fulcrumed on the actuating member 36. The flipper is connected by a spring 46 to a movable contact carrying member 75. This last named member 75 is fabricated from insulating material with reinforcements of metal at the bearing end and with the contacts 47 set in a metal member 48, preferably copper, loosely engaged to the movable member 75. This loose connection allows for a slight "wiping" action as the movable contact 47 meets the fixed contacts 49. A fixed stop 50 is provided for the movable member 75 to limit its snap movement. The stop 50 is permanently fixed to the base plate 20. A lever 51 is pivoted on the shaft 52 which shaft also acts as the bearing for the actuating member 36. The shaft 52 is supported by bearings 53 mounted on the base plate 20. The lever 51 acts through a spring 54, adjustable by the nut 76 on the screw 55 as shown in Fig. I to cooperate with the tension spring 35.

The afore-described mechanism constitutes the snap means of this switch when operated automatically. For manual operation a bar shaped knob 26 shown in Fig. I is pivoted on the casing 21 by the pin 56. The other end of the bar is pivotally connected to the lever 58 by a pin 57. This lever is pivoted by a pin 59 to a lever 60 which is pivoted on member 50 by pin 64, shown in Fig. 2. The lever 60 is adapted to engage the snap means previously described through a projection 73. This projection 73 throws the contacts 47 and 49 open, if the switch is in a normal closed position, when the bar 26 is moved to the "stop" position. The bar and associated levers are made to snap in either direction and held in that position by a spring 61 connected between lever 60 and the insulated bearing 62 mounted on a lever 63. The lever 63 comprises a means for causing cooperation between the manual switch and an overload device. The lever 63 is connected to lever 60 through an insulating member 65 which has a semi-circular slot therein as shown at 74 in Fig. 7 which allows manual operation of the switch without disturbing the overload cut-out device.

The overload device used is the usual form of "solder pot" consisting of a spurred wheel 66 shown in Fig. 2 cooperating with the notched lever 63. This wheel is mounted in a low melting alloy or solder 69 which has a heating coil 67 cast within. This coil is in series with the main circuit that passes through the switch and being of a resistant nature responds to changes in current by changing temperature. Should an oveload pass through the switch, the coil will get sufficiently hot to melt the solder and allow the wheel 66 to turn due to the tension of spring 61 and a spring 79 both of which are attached to and pull on lever 63. This movement of the lever 63 will cause opening of the switch through the cooperating action of levers 64 and 60 to thereby operate the snap means to open the switch. The switch will remain open until reset by the manual bar button 26 which on pressing to the closed or "start" position will force the notched lever 63 to again engage wheel 66 and replace the tension on springs 61 and 79. The wheel will remain in position since as soon as the current is broken by the opening of the switch, the solder re-sets due to the cooling of the heating coil 67.

The overload device reacts coperatively with the manual control. If the bar 26 is in the start position, the overload will "trip" it to the stop position and the entire device cannot be operated by the automatic means to close the switch until reset manually. It will be noted that wheel 66 is provided with a washer 68 to assure alignment of the lever 63 with the wheel 66.

Fig. 8 shows the relative position of the wheel 66 to the contacts as set in the insulating member 25. Fig. 9 shows the blade type of plug connection 70 in relation to the rear end of the fixed contacts 44 one of which is beneath a connection and the other is in series with the heating coil 67 and connection 70.

One of the features of my invention is the provision of the dual stop means previously referred to, and designated by numerals 33 and 34. These stops act to limit the movement of the slidable member and connected lever in the two extreme adjustment positions. The stop 34 is disposed so as to limit the sliding movement of the member 32, downwardly as viewed in Figs. 3, 4, and 5. In other words, the fast freeze stop 34 is set to engage the slidable member 32 before the adjusting knob has been completely rotated, and therefore, it will nullify the action of further rotation of the knob. Then too, the two stops may be set to vary the limiting settings of the device without disturbing the normal or "middle" adjustment settings.

Figure 10:
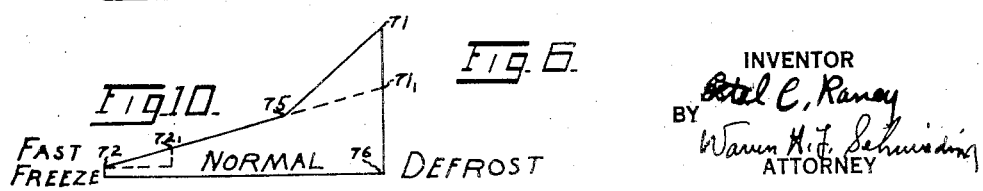
Fig. 10 is a graphic representation of the accelerated adjustment feature.

Fig. 10 shows a chart which graphically describes the action of the adjusting cam, lever and associated stops. The sloped line 72—71₁ represents the uniform slope of the cam 29 if no cooperating levers were provided. In other words, the rise from 76 to 71₁ is the full movement supplied to the spring 35 by the rotation of the cam 29 between stops 72 and 71. In the construction of the device there is also provided a lever action which starts when the lever 31 bears on the stop 33 which, of course, is adjustable. This point is designated at 75. The vertical displacement from 71₁ to 71 represents the movement imparted to the spring 35 by the action of the lever 31. When this movement is added to the displacement afforded by the cam, a total movement of 76—71 is obtained, which has previously been termed the accelerated movement since it is equal to the sum of the normal movement 76—71₁ and the lever movement 71₁—71. The point 75 may move in either direction according to the adjustment of the stop 33. Numeral 72₁ represents the position of the cam when the fast freeze stop 34 is adjusted to its highest setting. In this event the action of the knob and cam are nullified during the remainder of their rotation to the stop 72 on the cam. If this stop 34 is adjusted to the lowest setting the cam will adjust the mechanism completely then to the stop 72.

From the foregoing description it will be noted that my present type of switch provides a full automatic control unit for an electric refrigerator, combining three separate adjustments on a single control dial, together with internal adjustments for varying the limits of operation. The switch also provides snap action control for manual, automatic and emergency operations through the design of the mechanism.

Thus it is apparent that the controller as described has certain marked advantages that make it universally applicable to various makes and sizes of refrigerators. It is a known fact that cabinets manufactured by different concerns have different heat loss characteristics; as have cabinets of different sizes. To use a single control in any type or size of cabinet, it is necessary to have a flexible device capable of various adjustments to compensate for the variations in the boxes. My controller incorporates adjustments for differential, temperature range, defrosting limits and fast freeze limits, all easily set to compensate for any condition. My controller is therefore, sufficiently flexible to be applied to any specific installation without the necessity of changing the switch design or other major alteration. For example: the low limit to which some manufacturers desire to decrease the temperature of their evaporators may be, for example, 22° F. and in that event the screw stop 34 will be adjusted to limit the movement of the slidable member 32 so that the controller operates at 22° F., in that event the stop screw 34 would be adjusted differently. In any event the cam surface moves away from the rod 38 before the knob is turned to the extreme quick freezing position so that the cut-out point of the switch is governed entirely by the adjustment of stop screw 34. On the other hand the screw stop 33 determines the point at which accelerating movement is imparted to the lever 31 and in this manner the defrost temperature setting desired by the refrigerator manufacturer can be obtained.

Another distinct advantage imparted by the adjustable stop means is to reduce manufacturing problems and expense. In other types of adjustments it is necessary to use a different slope cam for each specific adjustment range. The present design incorporating the adjustable stops for the fast freeze and defrost positions allows for a variation in the cam and at the same time makes it possible to use one cam in all thermostats, by simply adjusting the stops.

While the present control is especially adaptable to electric refrigerators and while the description has been limited to a refrigerator control, it is to be understood that the scope of my invention is not limited to this one specific use. Adjustment features as described would be advantageous in any type control device. It is further pointed out that the use of a bellows as the thermal actuating means should not be construed in the narrow sense but that any thermal means, as thermostatic metal, expansive rods and tubes, etc., could be equally well used in the device and properly adjusted by the control means provided.

While the forms of embodiment of the present invention as herein disclosed constitute preferred forms, it is to be understood that other forms might be adopted, all coming within the scope of the claims which follow:

I claim:

1. In a controller comprising in combination, actuating means, adjustment means adapted to affect the actuating means, said adjustment means being so constructed as to provide a certain rate of adjustment throughout its adjusting range, and stop means cooperating with the adjustment means for changing the rate of adjustment of the actuating means during a part only of the adjusting range.

2. A controller comprising in combination, an actuating member, a movable adjustment means cooperating with said actuating member and being movable over a limited range for varying the action of said actuating member, stop means disposed to cooperate with the adjusting means to nullify the effect of the adjustment means over part only of the said range of movement of the adjusting means.

3. A controller comprising in combination, an actuating member, a spring, a slidable member, a lever carried by the slidable member, said lever and slidable means being connected to said actuating member by the spring, an adjustment member and a stop means, said adjustment member being so disposed as to displace said slidable member and lever longitudinally during certain adjustments, said stop means being so disposed that on further adjustment of the device, said lever bears upon the stop means and provides multiplied lever action on the spring in addition to the aforementioned longitudinal movement.

4. A controller comprising in combination, a slidable member, a lever engageable with said slidable member, an adjustment means, a stop means for limiting the movement of one end of said lever over part of the adjustable range of the device, a spring and an actuating means, said spring connecting the opposite end of said lever to the actuating means, said lever being so disposed in relation to the stop means that during part of the adjustable range it acts as an integral part of the slidable member and during another part of the adjustable range it acts as a third class lever.

5. A controller comprising in combination, an adjustment means, an actuating member, a slidable member and a lever attached to said slidable member, a spring connecting said lever to the actuating member, stop means provided to limit the adjustable setting of the device in the high and low positions, one of said stops being disposed to bear on the lever member during part of the adjustable range and the other of said stops being disposed to bear on the slidable member during another part of the adjustable range.

6. A controller comprising in combination, an actuating member, means for yieldingly affecting the movement of said actuating member, means for adjusting the yielding means over a predetermined range, and a stop means for limiting the effect of the yielding means to lessen the effectual control of the adjusting means over a part only of the range of movement of the adjusting means.

7. A controller comprising in combination, an actuating member; means for yieldingly affecting movement of said member; adjusting means adapted to adjust the yielding means between predetermined limits, said adjusting means including a member movable thereby and providing a certain rate of adjustment throughout the adjustment range thereof; and stop means cooperating with the adjusting means for changing the rate of adjustment of the yielding means by the movable member during a part only of the adjusting range.

8. A controller comprising in combination, actuating means; a spring for yieldingly affecting movement of said actuating means; adjusting means for varying the effect of said spring on said actuating member throughout the adjustment range of the adjusting means; and stop means disposed to limit the adjusting effect of the adjusting means on the spring over a part only of the range of adjustment of the adjusting means.

9. A controller comprising in combination, actuating means; a spring for yieldingly affecting movement of said actuating means; adjusting means for varying the effect of said spring on said actuating means, said adjusting means including a member movable thereby and providing a certain rate of adjustment through the adjustment range thereof; and stop means disposed to cooperate with said adjusting means for changing the rate of adjustment of the spring over a part only of the adjusting range of the movable member.

10. A controller comprising in combination, an actuating member; a spring yieldingly affecting said member; adjustment means for adjusting said spring over a predetermined adjustment range for varying the effect of the spring on the actuating member; a stop adapted to cooperate with said adjustment means during a part only of said adjustment range for nullifying the effect of the adjustment means on said spring; and a second stop adapted to cooperate with the adjustment means during another part of the adjusting range for changing the rate of adjustment of the adjustment means on the spring.

11. A controller comprising in combination, an actuating member; means for yieldingly affecting said member; adjustment means for varying the effect of the yielding means on the actuating member over a predetermined range of adjustment; and stop means disposed to cooperate with the adjustment means for changing the effect of the adjustment means on the yielding means, said stop means becoming effective only as said adjusting means approaches an extremity of its adjusting range.

12. A controller comprising in combination, an actuating member; a lever capable of slidable longitudinal movement; a spring connecting the lever to the actuating member; adjustment means disposed to displace the lever longitudinally for varying the effect of said spring on said actuating member; stop means disposed to limit the slidable longitudinal movement of said lever in one direction and to engage the lever when further adjusted by the adjustment means.

13. A controller comprising in combination, an actuating member; a lever capable of slidable longitudinal movement; a spring connecting the lever to the actuating member; adjustment means disposed to displace the lever longitudinally for varying the effect of said spring on said actuating member; and stop means disposed to limit the longitudinal movement of the lever in one direction to nullify further adjustment of the adjustment means on said lever.

ESTEL C. RANEY.